(12) United States Patent
Jung

(10) Patent No.: US 10,050,566 B2
(45) Date of Patent: Aug. 14, 2018

(54) GENERATOR FOR AUTOMOBILE USING FLEXIBLE PIEZOELECTRIC DEVICE

(71) Applicant: Industry-Academic Cooperation Foundation, Yonam institute of Digital Technology, Jinju-si (KR)

(72) Inventor: Daesung Jung, Jinju-si (KR)

( * ) Notice: Subject to any disclaimer, the term of this patent is extended or adjusted under 35 U.S.C. 154(b) by 442 days.

(21) Appl. No.: 14/952,965

(22) Filed: Nov. 26, 2015

(65) Prior Publication Data
US 2017/0141703 A1    May 18, 2017

(30) Foreign Application Priority Data

Nov. 13, 2015    (KR) .................... 10-2015-0159369

(51) Int. Cl.
*H01L 41/113*    (2006.01)
*H02N 2/18*    (2006.01)
*B60C 19/00*    (2006.01)
*B60C 5/12*    (2006.01)

(52) U.S. Cl.
CPC ............. *H02N 2/18* (2013.01); *B60C 19/00* (2013.01); *B60C 5/12* (2013.01); *Y10S 74/09* (2013.01)

(58) Field of Classification Search
CPC .......... H02N 2/18; B60C 19/00; H01L 41/113
USPC ........................................................ 310/339
See application file for complete search history.

(56) References Cited

U.S. PATENT DOCUMENTS

2005/0110277 A1 * 5/2005 Adamson ............ B60C 23/0411
290/1 R

FOREIGN PATENT DOCUMENTS

| DE | 102007010780 A1 * | 12/2007 | ............ B60C 19/00 |
| JP | 2011-041344 | 2/2011 | |
| KR | 20-1998-0028334 | 8/1998 | |
| KR | 10-2003-0039692 | 5/2003 | |

OTHER PUBLICATIONS

English specification of 10-2003-0039692.
English specification of 20-1998-0028334.
English abstract of 2011-041344.

* cited by examiner

*Primary Examiner* — Thomas Dougherty
(74) *Attorney, Agent, or Firm* — Antonio Ha & U.S. Patent, LLC

(57) ABSTRACT

According to an embodiment of the present disclosure, a generator using a flexible piezoelectric device comprises a tire with a hollow tube structure, a ring-shaped inner wall formed on an inner surface of the tire, a supporting frame connecting a center of the tire with in inner surface of the tire to support the inner wall, and a flexible piezoelectric device fastened or mounted on an overall outer surface of the inner wall. The flexible piezoelectric device is pressurized to generate electricity as the tire is compressed by contact with the ground and at space between the inner wall and the inner surface of the tire is thus reduced.

6 Claims, 4 Drawing Sheets

GENERATOR FOR AUTOMOBILE USING FLEXIBLE PIEZOELECTRIC DEVICE

CROSS-REFERENCE TO RELATED APPLICATIONS

This patent application claims priority under 35 U.S.C. § 119 to Korean Patent Application No. 10-2015-0159369, filed on Nov. 13, 2015, in the Korean Intellectual Property Office, the disclosure, of which is incorporated by reference herein in its entirety.

TECHNICAL FIELD

Embodiments of the present disclosure concern auxiliary generators using a piezoelectric device, and more specifically, to generators using a flexible piezoelectric device that are applicable to automobile tires.

DISCUSSION OF RELATED ART

Various research efforts to prolong the battery the of automobiles are vigorously underway. Some examples are directed to adding a piezoelectric device to the suspension system of the car to recharge the battery. Such approaches, however, fail to steadily and stably recharge the battery.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

SUMMARY

According to an embodiment of the present disclosure, there is disclosed a generator using a flexible piezoelectric device that may apply to a vehicular tire. The generator comprises a tire with a hollow tube structure, a ring-shaped inner wall formed on an inner surface of the tire, a supporting frame connecting a center of the tire with an inner surface of the tire to support the inner wall, and a flexible piezoelectric device fastened or mounted on an overall outer surface of the inner wall. The flexible piezoelectric device may be pressurized to generate electricity as the tire is compressed by contact with the ground and a space between the inner all and the inner surface of the tire is thus reduced.

The supporting frame may be formed of a flexible material to be compressed when the tire is compressed to contact the inner wall.

The flexible material may include a spring.

The inner wall may include a plurality of layers, wherein a plurality of flexible piezoelectric devices are positioned in spaces between the plurality of layers. As the tire contacts the ground and compresses, the plurality of flexible piezoelectric devices may be substantially simultaneously pressurized to together produce electricity.

The generator may further comprise a substantially U-shaped side supporting plate formed on a side of the inner wall, the flexible piezoelectric device formed on an overall outer surface of the side supporting plate.

The side supporting plate may be formed of an elastic material and is warp corresponding to the inner surface of the tire. The side supporting plate may be further warped to tightly push the inner surface of the tire to pressurize the flexible piezoelectric device as the tire contacts the ground and compresses.

DETAILED DESCRIPTION OF EXEMPLARY EMBODIMENTS

Hereinafter, exemplary embodiments of the inventive concept will be described in detail with reference to the accompanying drawings. Like reference denotations may be used to refer the same or similar elements throughout the specification and the drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when element or layer is referred to as being "on," "connected to," "coupled to," or "adjacent to" another element or layer, it can be directly on, connected, coupled, or adjacent to the other element or layer, or intervening elements or layers may be present.

Figure 1:
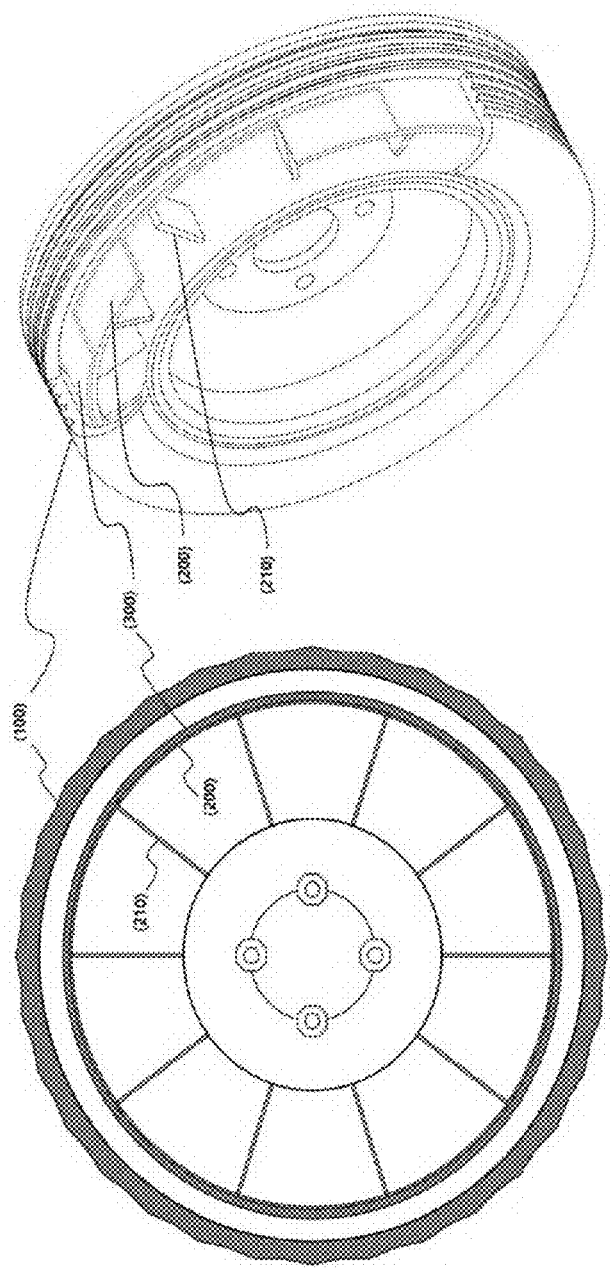
FIG. 1 is a view illustrating an overall configuration of a generator using a flexible piezoelectric device applied to an automobile tire, according to an embodiment of the present disclosure.
Figure 2:
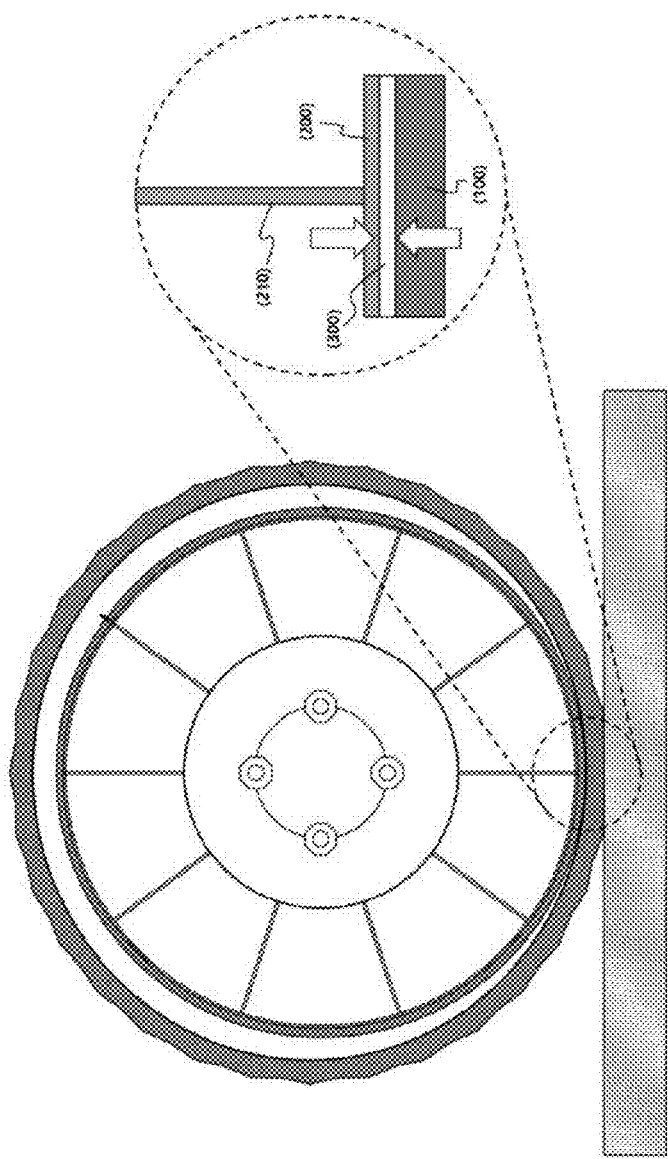
FIG. 2 is a view illustrating an example of operating a generator using a flexible piezoelectric device applied to an automobile tire, according to an embodiment of the present disclosure.

FIG. 1 is a view illustrating an overall configuration of a generator using a flexible piezoelectric device applied to an automobile tire, according to an embodiment of the present disclosure. FIG. 2 is a view illustrating an example of operating a generator using a flexible electric device applied to an automobile tire, according to an embodiment of the present disclosure.

According to an embodiment of the present disclosure, the generator using a flexible piezoelectric device may apply to an automobile or any moving, carrying, or travelling machines or systems with a tire or wheel, but without limited thereto.

Referring to FIG. 1, the generator using a flexible piezoelectric device includes a tire 100 with a hollow tube structure, a ring-shaped inner wall 200 formed on an inner surface of the tire 100, a supporting frame 210 connecting the center of the tire 100 with an inner surface of the inner wall 200 to support the inner wall 200, and a flexible piezoelectric device 300 fastened or mounted on an overall outer surface of the inner wall 200. The flexible piezoelectric device 300 may generate electricity when pressurized as the tire 100 is compressed by contact with the ground and thus the space between the inner wall 200 and the inner surface of the tire 100 is reduced.

For example, the tire 100 may be a pneumatic tire with a hollow tube structure. The tire 100 may have an empty space therein, and the inner wall 200 may be installed in the empty space as shown in FIG. 1.

The supporting frame 210 may connect a center rim of the tire 100 with the inner surface of the inner wall 200 to fasten the inner wall 200 to the inside of the tire 100 as shown in FIG. 1.

The supporting frame 210 may be formed of a flexible or elastic material.

Referring to FIG. 2, as the tire 100 may be compressed by contact with the ground, the supporting frame 210 may also be brought in contact with the inner wall 200 and compressed together, preventing the shock-absorption of the tire 100 from deteriorating while supporting the inner wall 200 in position.

When the supporting frame 210 is otherwise formed of an inflexible, hard material, the supporting frame 210 may push out the inner surface of the tire 100 compressed as contacting the ground, and in this case, the shock absorption of the tire 100 may be deteriorated.

The supporting frame 210 may be formed of a flexible polymer material to allow the tire 100 to properly exert its own shock absorption effect. Accordingly, the supporting frame 210 may pressurize the inner surface of the tire 100 while preventing the tire 100 from being repulsive when the tire 100 is compressed, thereby preventing a deterioration of the shock absorption of the tire 100 against the ground.

Alternatively, the supporting frame 210 may be formed of a spring or other elastic materials than the flexible polymer material.

Figure 3:
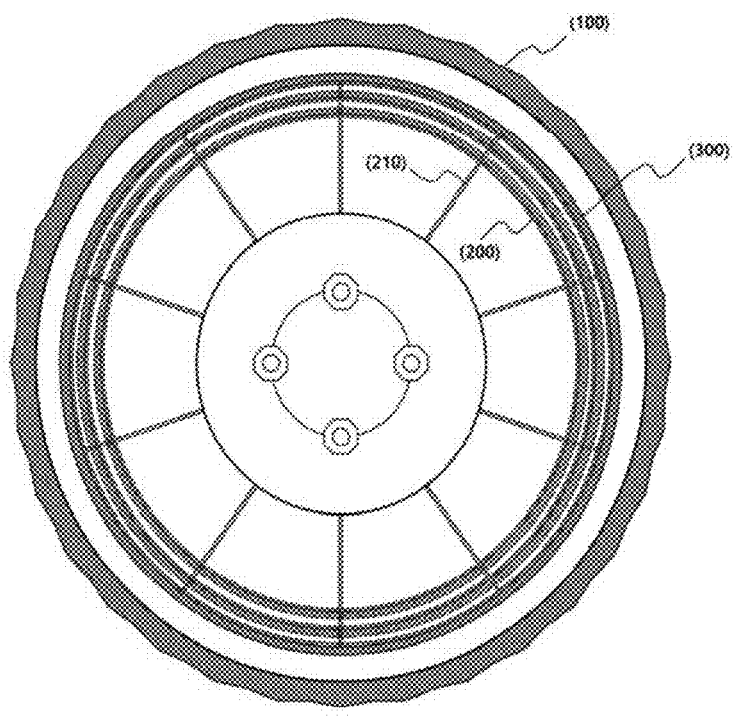
FIG. 3 is a view illustrating an example of a generator using a flexible piezoelectric device applied to an automobile tire and having multiple inner wall layers, according to an embodiment of the present disclosure.

FIG. 3 is a view illustrating an example of a generator using a flexible piezoelectric device applied to an automobile tire and having multiple inner wall layers, according to an embodiment of the present disclosure.

Referring to FIG. 3, the inner wall 200 may include multiple layers. Flexible piezoelectric devices 300 may be positioned in spaces between the multiple layers inner wall 200. Thus, as the tire 100 is compressed by contact with the ground, the multiple flexible piezoelectric devices 300 may be pressurized substantially simultaneously to together produce electricity.

For example, each of the plurality of flexible piezoelectric devices 300 may be disposed in the space between two adjacent ones of the multiple layers of inner wall 200. When the tire 100 contacts the ground and compresses, the uppermost layer of the inner wall 200 may pressurize its immediately underlying layer of the inner wall 200, which may then pressurize its underlying layer of the inner wall 200. As such, the multiple layers of inner wall 200 may be sequentially pressurized, thereby enabling the plurality of flexible piezoelectric devices 300 positioned therebetween to produce electricity.

Figure 4:
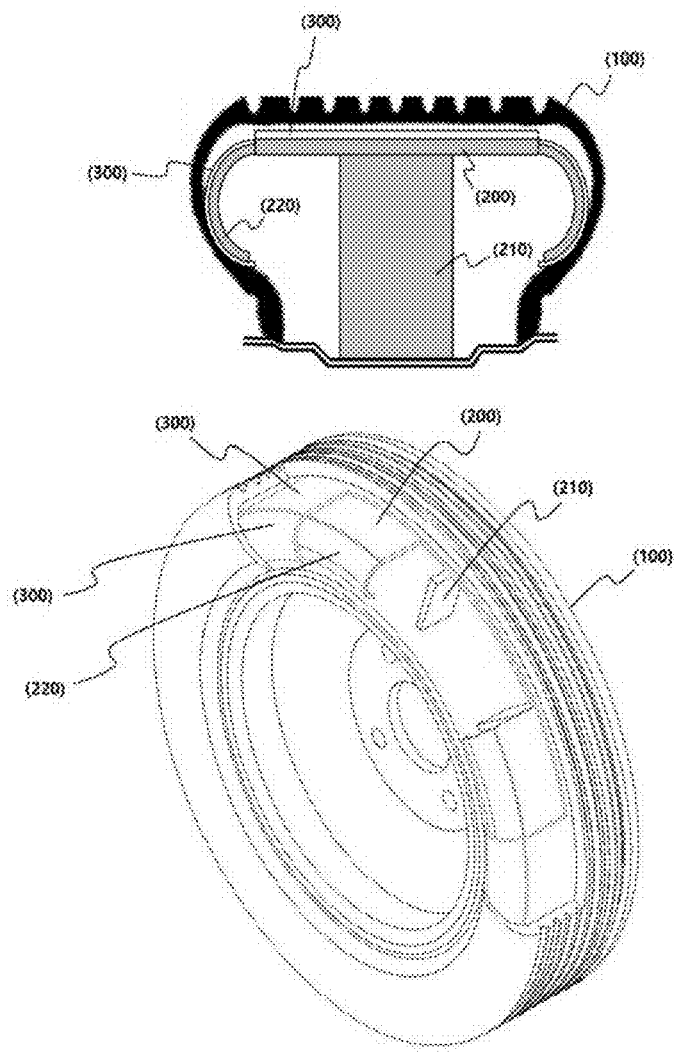
FIG. 4 is a view illustrating a generator using a flexible piezoelectric device applied to an automobile tire and having a side support plate, according to an embodiment of the present disclosure.

FIG. 4 is a view illustrating a generator using a flexible piezoelectric device applied to an automobile tire and having a side support plate, according to an embodiment of the present disclosure.

Referring to FIG. 4, a side supporting plate 220 substantially shaped in its cross section as the letter "U" may be formed on a side surface of the inner wall 200. A flexible piezoelectric device 300 may be formed on an overall outer surface of the side supporting plate 220. The side supporting plate 220 may be formed of an elastic material. The side supporting plate 220 may have a shape curved corresponding to an inner surface of the tire 100. When the tire 100 contacts the ground and compresses, the side supporting plate 220 may further warp, more tightly pushing the inner surface of the tire 100 while pressurizing the flexible piezoelectric device 300.

For example, the side supporting plate 220 curved corresponding to the inner surface of the tire 100 may be more curved or bent when the tire 100 is compressed and may thus be bright in more tight contact with the inner surface of the tire 100 while pushing the inner surface of the tire 100. Therefore, the flexible piezoelectric device 300 formed on the overall outer surface of the side supporting plate 220 may be pressurized, thus enabling additional power production.

As such, adding multiple layers of inner wall 200 and side supporting plates 200 may increase the area for producing electric power, thus allowing the flexible piezoelectric devices 300 more increased power generation efficiency and resultant increased power production.

The electric power produced by the flexible piezoelectric devices 300 may be transferred to the battery of the car. Although electric wires may be used to convey the electric power to the battery, the electric wires may be twisted or tangled while the tire 100 turns around.

According to an embodiment of the present disclosure, a structure (not shown) to prevent such twist or tangle may be used instead of such electric wires to transfer the power electricity. Alternatively, the produced power electricity may be transferred to the battery via some connecting parts of the automobile which are formed of electrically conductive materials (e.g., metals). In this case, electric wires may be partially used in portions where no twist or tangle occurs.

However, embodiments of the present disclosure are not limited thereto, and any other structures that may convey the electric power produced by the flexible piezoelectric devices 300 may be used without limitations.

According to embodiments of the present disclosure, as the tire contacts the ground and compresses, the space between the inner wall and the inner surface of the tire may be reduced, pressurizing the flexible piezoelectric devices formed on the inner wall to produce electric power. Accordingly, the pressure applied to the overall on may be steadily converted into electric power, leading to increased electric generation efficiency.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A generator using a flexible piezoelectric device, the generator comprising:
a tire with a hollow tube structure;
a ring shaped inner wall formed on an inner surface of the tire;
supporting frame connecting a center of the tire with an inner surface of the tire to support the inner wall; and
a flexible piezoelectric device fastened or mounted on an overall outer surface of the inner wall, wherein the flexible piezoelectric device is pressurized to generate electricity as the tire is compressed by contact with the ground and a space between the inner wall and the inner surface of the tire is thus reduced.

2. The generator of claim 1, wherein the supporting frame is formed of a flexible material to be compressed when the tire is compressed to contact the inner wall.

3. The generator of claim 2, wherein the flexible material includes a spring.

4. The generator of claim 1, wherein the inner wall includes a plurality of layers, wherein a plurality of flexible piezoelectric devices are positioned in spaces between the plurality of layers, and wherein as the tire contacts the ground and compresses, the plurality of flexible piezoelectric devices are substantially simultaneously pressurized to together produce electricity.

5. The generator of claim 1, further comprising a substantially U-shaped side supporting plate formed on a side of the inner wall, the flexible piezoelectric device formed on an overall outer surface of the side supporting plate.

6. The generator of claim 5, wherein the side supporting plate is formed of an elastic material and is warp corresponding to the inner surface of the tire, and wherein the side supporting plate is further warped to tightly push the inner surface of the tire to pressurize the flexible piezoelectric device as the tire contacts the ground and compresses.

\* \* \* \* \*